Sept. 29, 1970 R. H. WHIGHAM 3,531,726

ANALOG COMPARATOR

Filed Aug. 14, 1967

INVENTOR.
ROBERT H. WHIGHAM

BY

Drummond & Cahill

ATTORNEYS

United States Patent Office 3,531,726

Patented Sept. 29, 1970

3,531,726

ANALOG COMPARATOR

Robert H. Whigham, Houston, Tex., assignor to Burr-Brown Research Corporation, Tucson, Ariz., a corporation of Arizona Filed Aug. 14, 1967, Ser. No. 660,278
Int. Cl. H03k *17/30*
U.S. Cl. 328—147 1 Claim

ABSTRACT OF THE DISCLOSURE

An analog comparator utilizing the output of a conventional analog comparator to develop a feedback hysteresis level. The hysteresis level is switched to the input of the comparator in accordance with the sign and magnitude of the electrical magnitudes at the input of the comparator.

The present invention pertains to analog comparators, and more specifically, to an analog comparator having the capability of inserting or not inserting a hysteresis level at the input thereof.

The utilization of analog comparators to provide a digital output indicative of the relative magnitudes of input analog signals is well developed in the prior art. The electrical magnitudes X and Y are conventionally compared and, depending on the sign of the quantity (X minus Y), the output of the comparator will assume either of two distinct digital values. Significant difficulty exists in the application of such comparators when the values X and Y approach one another and the quantity (X minus Y) approaches zero. This problem is particularly acute in high-performance analog comparators wherein the problems of sensing noise results in chattering when the values X and Y approach each other. To alleviate the problem of noise and chattering, hysteresis is characteristically inserted in the comparator to thereby yield reliability of the comparator; however, the response time of a comparator utilizing hysteresis in accordance with the teachings of the prior art suffer from an increased response time. When extremely low response time comparators are required, design considerations are concerned with wide bandwidth which, in turn, exposes the comparator to a broader spectrum of noise thereby requiring, for reliability, even larger amounts of hysteresis.

It is therefore an object of the present invention to provide an analog comparator utilizing switched hysteresis.

It is still another object of the present invention to provide an analog comparator wherein hysteresis may be inserted into the input of the comparator only during times that the utilization of such hysteresis is required.

It is still another object of the present invention to provide an analog comparator utilizing a threshold detecting device to switch hysteresis off when the magnitude of the input values X and Y are sufficiently disparate (the quantity X minus Y is large) to negate the necessity of hysteresis.

These and other objects and advantages of the present invention will become apparent to those skilled in the art as the description thereof proceeds.

Briefly, in accordance with the embodiment chosen for illustration, a conventional analog comparator is utilized to receive and sense the difference between electrical magnitudes X and Y. These magnitudes, which are characteristically voltages, are applied to the comparator and, depending on the sign of the quantity (X minus Y), the comparator will provide a digital output of either of two levels indicating either positive or negative. A feedback hysteresis voltage is developed from the output of the comparator and fed back to the input thereof through an electronic switch which, in turn, is responsive to the switching of the digital ouput of the comparator and is also responsive to the detected magnitude of the value (X minus Y).

The present invention may more readily be described by reference to the accompanying drawings in which.

Figure 1:
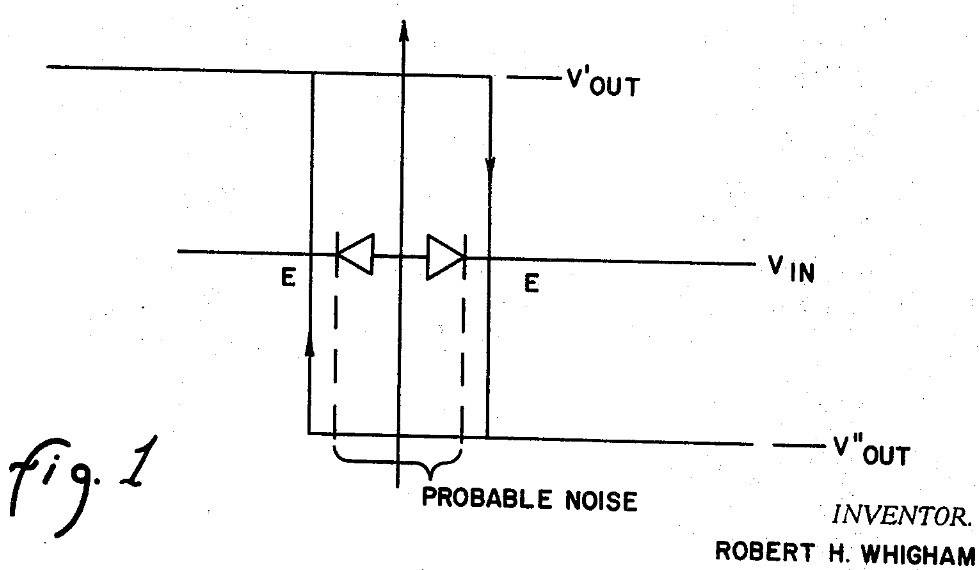
FIG. 1 is a schematic illustration of a response characteristic of an analog comparator useful for describing the problems previously inherent in analog comparators.

Referring to FIG. 1, the diagram shown therein represents a plot of input electrical magnitude ($V_{in}$) versus the digital output of the comparator ($V_{out}$). It may be seen that the output assumes either of two levels $V'_{out}$ or $V''_{out}$. The assumption of either of these output voltage levels depends on the input voltage and, ideally, an input voltage only slightly positive would result in an output voltage of $V''_{out}$ and an input voltage only slightly negative would result in an output voltage of $V'_{out}$. However, as can be seen by reference to FIG. 1, a typical application of the analog comparator will result in an insertion of noise in the input which will result in the unwanted chattering or triggering in the output voltage. To alleviate this problem, it is necessary to insert hysteresis indicated in FIG. 1 by $+E$ or $-E$. The magnitude $\pm E$ is chosen to exceed the magnitude of the probable noise. Therefore, to switch, for example, from an output voltage of $V'_{out}$, it is necessary for the input voltage to exceed the reference or zero level by the hysteresis level $+E$; conversely, to switch from an output voltage of $V''_{out}$ to an output voltage of $V'_{out}$, it is necessary for the input voltage to decrease from a value of $+E$ to a value of $-E$. It will be obvious that the inserted magnitude of the hysteresis $\pm E$ results in a delay in the switching of the output voltage. As previously indicated, this delay is an undesirable feature in fast comparators but is a feature that is required to even a greater extent in fast comparators.

Figure 2:
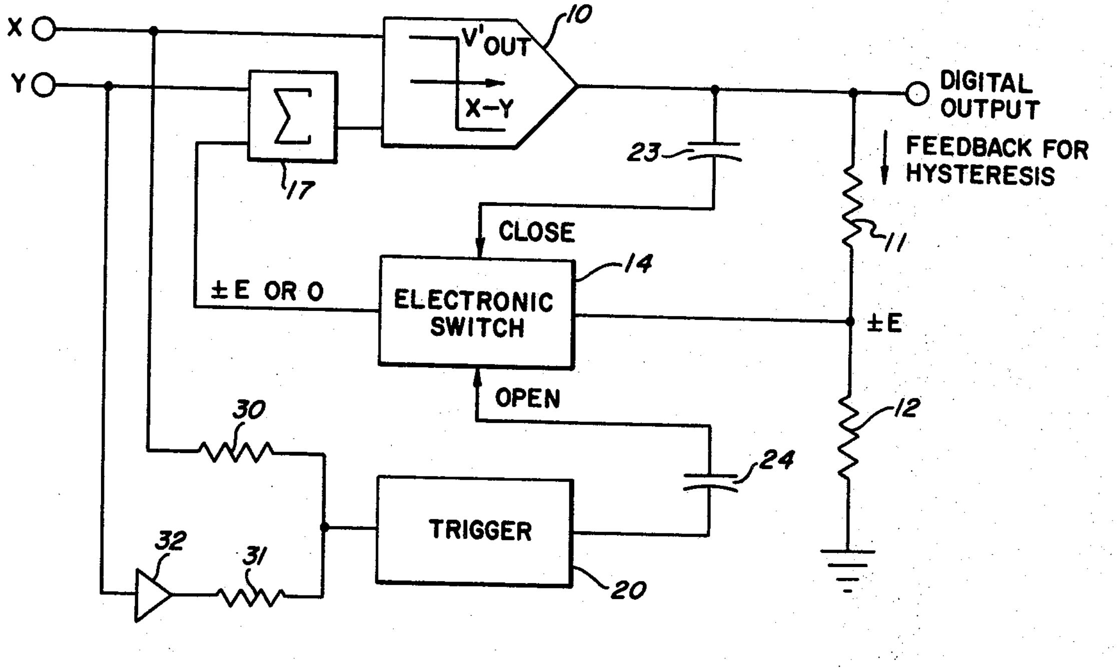
FIG. 2 is a schematic block diagram of an analog comparator constructed in accordance with the teachings of the present invention.

Referring now to FIG. 2, an analog comparator constructed in accordance with the teachings of the present invention is shown in block diagram. Each of the blocks of FIG. 2 represents a conventional electronic circuit the specific design of which may be formulated by reference to standard texts and practice in the electronic art. A wide variety of circuits exist that would be equally applicable to the block diagram of FIG. 2 and it is therefore unnecessary to describe in detail the conventional circuitry. An analog comparator 10 is connected to receive electrical magnitudes X and Y, which commonly will be voltage levels. The output of the comparator 10 is a digital output representing either of two voltage levels as described in connection with FIG. 1. The digital output is utilized to provide a feedback for hysteresis by connecting the output through resistors 11 and 12 forming a voltage divider network. The voltage thus derived from the divider is applied through an electronic switch 14 to a summing circuit 17 for insertion into the comparator 10 with the electrical magnitude Y. A triggering device 20 is provided and is responsive to the magnitude of the difference between the magnitudes X and Y and may be constructed in accordance with conventional design practices to provide a triggering pulse or switching signal at the output thereof when the difference (X minus Y) achieves a predetermined magnitude. A circuit such as a Schmitt trigger may be utilized as the triggering circuit 20. The output of the comparator 10 is coupled to the electronic switch 14 through a capacitor 23; similarly, the output of the triggering circuit 20 is coupled to the electronic switch through a capacitor 24.

The triggering circuit 20 may be adjusted to provide an appropriate output pulse or signal upon a predetermined magnitude of the quantity (X minus Y) by appropriately choosing the values for the resistors 30 and 31 and appropriately adjusting a conventional amplifier 32.

The operation of FIG. 2 may now be described. In a normal operating environment, when no switching is about to occur, the values of the electrical magnitude X and Y are likely to be far apart; that is, the magnitude of the quantity (X minus Y) may be relatively large and the noise normally encountered by the comparator will not affect the comparator or cause it to switch digital output. Under these operating conditions, a change in the sign of the quantity (X minus Y) may be sensed without the usual delay caused by the insertion of hysteresis. Therefore, no hysteresis is desired during this relatively quiescent time. However, immediately after the change of sign of the quantity (X minus Y), the magnitude of the difference between the quantity X and Y is usually small (and hopefully getting larger—with opposite sign) and the comparator is susceptible to noise since the superimposition of noise on the small difference between X and Y may cause the comparator 10 to chatter. It is therefore desirable for hysteresis to be superimposed at the input of the comparator until the quantity (X minus Y) again becomes large. The comparator 10 provides an appropriate digital output which, as explained previously, develops a hysteresis voltage applied to an electronic switch. The condition of this switch is determined by the comparator 10 and the triggering circuit 20. When the comparator circuit 10 changes the level of the digital output, the change in output is applied through the capacitor 23 to the switch 14 to close the latter and thus apply the hysteresis level developed in the voltage divider to the summing circuit 17 to be summed with the magnitude Y and applied to the comparator 10. Thus, immediately after the change of sign of the quantity (X minus Y) and immediately after the switching of the comparator digital output, hysteresis is inserted in the input of the comparator to cause it to become immune to noise during the period when it would otherwise be susceptible to noise.

After the comparator 10 has changed digital output level, the magnitude of the difference (X minus Y) again becomes large and in being large renders the comparator insensitive to noise. To thereby eliminate the disadvantages caused by the application of hysteresis to the comparator, the triggering circuit 20 senses when the magnitude of the quantity (X minus Y) achieves a predetermined level for developing an output pulse to be applied through the capacitor 24 to the electronic switch 14. The application of the signal from the triggering circuit 20 to the electronic switch causes the latter to open and thereby remove the hysteresis feedback level from the summing circuit 17. The result of the removal of hysteresis renders the comparator 10 susceptible to a change in sign of the quantity (X minus Y) without the deleterious effect of the insertion of hysteresis.

It may therefore be seen that the present invention utilizes conventional components arranged to enable a prior art analog comparator to selectively use hysteresis to prevent the chattering of the comparator as a result of noise; similarly, the present invention does not require the delay incurred by the utilization of hysteresis.

It will be obvious to those skilled in the art that a variety of circuits may be chosen for utilization in the comparator of the present invention; it is therefore intended that the present invention be limited only by the scope of the claim appended hereto.

I claim:

1. An analog comparator comprising: comparator means responsive to the sign of the difference between two electrical magnitudes X and Y for providing either of two digital output levels; sensing means comprising a Schmitt trigger responsive to a predetermined magnitude of the difference between X and Y for providing a switching signal; a hysteresis feedback loop connected between the output and input of said comparator means for generating a hysteresis level, said loop including a switch for applying when in a closed condition, or not applying when in an open condition, said hysteresis level to the input of said comparator; said switch connected to said comparator means and responsive to a change in the digital output level thereof for assuming a closed condition; said switch also connected to said sensing means and responsive to said switching signal for assuming an open condition.

References Cited

UNITED STATES PATENTS

| | | | |
|---|---|---|---|
| 3,018,386 | 1/1962 | Chase | 307—231 |
| 3,166,678 | 1/1965 | Fleshman et al. | 307—235 |
| 3,281,608 | 10/1966 | Doyle | 307—235 |
| 3,316,423 | 5/1967 | Hull | 307—235 X |
| 3,353,033 | 11/1967 | Gilbert | 307—235 |

FOREIGN PATENTS

| | | |
|---|---|---|
| 900,596 | 8/1958 | Great Britain. |

JOHN S. HEYMAN, Primary Examiner

U.S. Cl. X.R.

328—115, 150